United States Patent Office 3,666,357
Patented May 30, 1972

3,666,357
DEVICE FOR SELECTIVELY SWITCHING-OVER THE SPEED OF FEEDING FILM IN MOTION PICTURE PROJECTOR
Tadao Hayami, Tokyo, Japan, assignor to Kabushiki Kaisha Koparu, Tokyo-to, Japan
Filed Mar. 2, 1970, Ser. No. 15,425
Claims priority, application Japan, Mar. 17, 1969, 44/20,250
Int. Cl. G03b 21/48
U.S. Cl. 352—180      3 Claims

ABSTRACT OF THE DISCLOSURE

A device for selectively switching-over the speed of feeding film by effecting cyclic movement of a claw member in a motion picture projector has an intermediate lever associated with the claw member having first and second cam faces at one side and a third cam face at the other side, and pivotably attached to a coupling member manually operable for setting at three positions, namely, standard projection, slow-motion projection and stop-motion projection, and also a filter member associated with the coupling member, urged in one direction away from the light path leading to the film, so that the filter member is moved away from the light path only when the coupling member is brought into the position of the stop-motion projection.

BACKGROUND OF THE INVENTION (a) Field of the invention

The present invention is concerned with a device for switching-over the speed of feeding film in a motion picture projector of the type that the film is fed by the cyclic movement of a claw member which is produced by two cams which are rotated interlockingly with the rotation of the shutter.

(b) Description of the prior art

In order to perform a slow-motion projection by the use of a reel of film subjected to a photography taken at a standard speed, the projector which is used for this purpose requires the provision of means for retarding the speed with which the film is fed. As the projectors provided with such means, there are those of the known types which are arranged so that the speed of each one cycle of movement of the claw member can be retarded either by decreasing the number of rotation of the driving motor by the manipulation of a switch-over means, or by the use of a speed reduction gear. Such arrangements of the prior art, however, have the drawback that the image which is projected onto the screen flickers owing to the fact that the speed with which the film crosses the aperture is retarded. In order to eliminate this drawback of the prior art, there is a known arrangement which is operative in such a way that the transmission of said cyclic movement of the claw member to the film is interrupted at the rate of once in several cycles of such movement and that, nevertheless, the velocity of the movement of the claw member in any one cycle is not altered and that, accordingly, the speed of the film with which it crosses the aperture is not retarded. However, the projectors of this type which have been provided in the past had complicated structures so that their manufacture encountered a tremendous difficulty and that their manufacturing cost was never reasonable.

SUMMARY OF THE INVENTION

It is, therefore, an object of the present invention to provide a motion picture projector equipped with a device for selectively switching-over the speed of feeding film, which is of such a simplified structure that it permits the projection of a slow-motion projection without causing any flickering of the image projected onto a screen.

The aforesaid object is attained by the provision of a switch-over device comprising:

A coupling plate adapted to be placed selectively a plurality of positions by a switch-over means;

An intermediate lever adapted to be forced to make continuous reciprocating movement by cam means pivotably attached to said coupling plate;

A transmitting means which, whenever said coupling plate is placed in its position for the slow-motion projection, is capable of transmitting the reciprocating movement of said intermedate lever to the claw member to thereby interrupt the transmission, to the film, of the cyclic movement of said claw member—which is the movement intended for feeding the film—at the rate of once in several cycles; and Means which, whenever said coupling plate is placed in its position for the standard projections, is capable of entirely interrupting the transmission—which is effected by said transmitting means—of the reciprocal movement of the intermediate lever to the claw member.

Another object of the present invention is to provide a motion picture projector which is also capable of performing the stop-motion projection by merely providing an additional small and simple equipment to the aforesaid switch-over device of the present invention.

This object is attained by the provision of the arrangement that, whenever the coupling plate is placed in its position for the stop-motion projection, either the intermediate lever or the transmitting means is held in its position for making the cyclic movement of the claw member totally ineffective and that, during this period, a filter is adapted to be interposed between the film and the projection lamp.

DESCRIPTION OF THE PREFERRED EMBODIMENT

Figure 1:
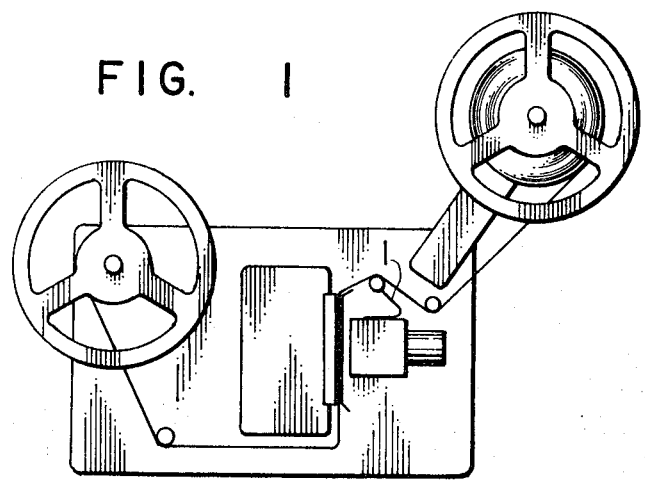
FIG. 1 is a somewhat diagrammatic side elevation of a motion picture projector of the sprocketless type.

In FIG. 1, reference numeral 1 represents a buffer member which is employed in motion picture projectors of the sprocketless type.

Figure 2:
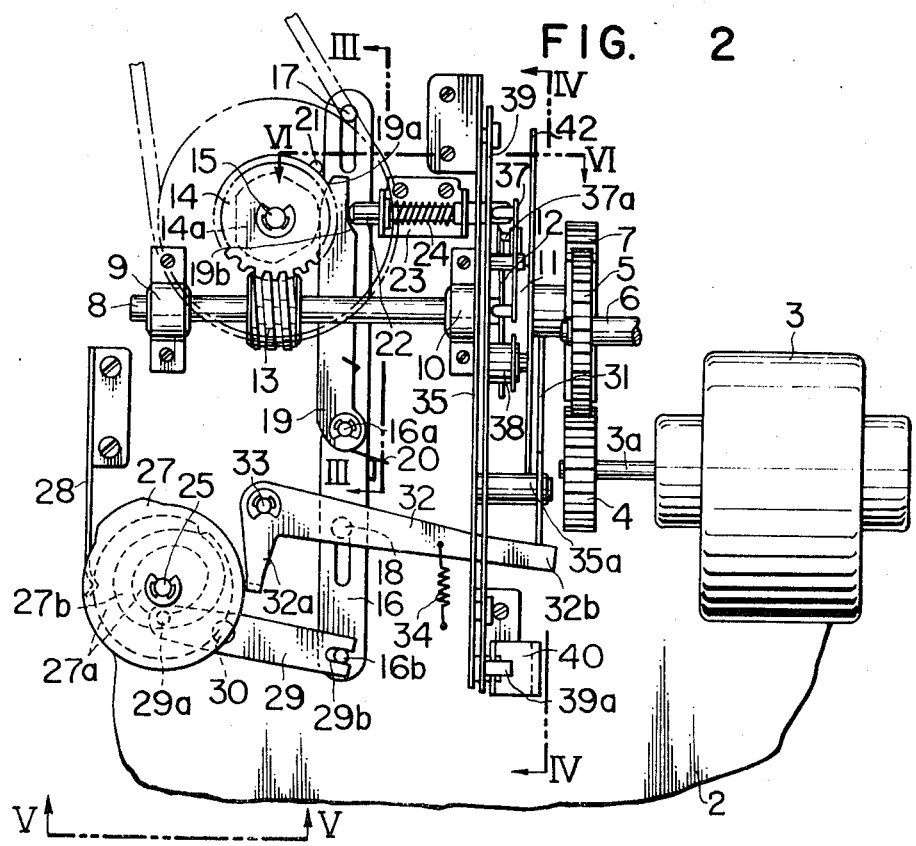
FIG. 2 is a somewhat schematic explanatory representation of one embodiment of the present invention.
Figure 3:
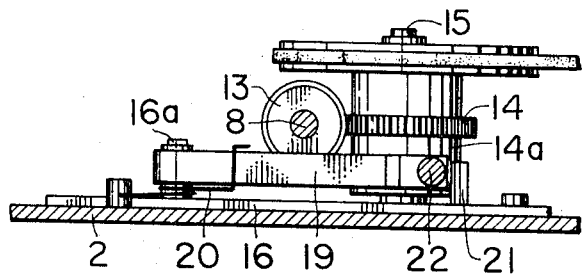
FIG. 3 is a sectional view taken along the line III—III in FIG. 2.

FIG. 2 shows the internal structure of the projector as viewed from the back side of the projector in FIG. 1. Reference numeral 2 represents the base plate of the projector body. A driving motor 3 is fixed to said base plate 2. A toothed wheel 4 is mounted on a rotary shaft 3a of the motor 3 and it meshes with a toothed wheel 5. A toothed wheel 7 is mounted on a shaft 8 which is capable of rotating the shutter, and this toothed wheel 7 meshes with said toothed wheel 5. Said shaft 8 is received in and supported by bearings 9 and 10 which are secured to the base plate 2. Said shaft 8 is provided further with cams 11 and 12 and a worm 13. A worm gear 14 which meshes with said worm 13 is formed integrally with a cam 14a and it is mounted rotatably on a shaft 15.

A coupling plate 16 is provided for vertical movement in FIG. 2 by means of guide shafts 17 and 18. An intermediate lever 19 is of an inclined face 19a and a stepped portion 19b, and this intermediate lever 19 is mounted on a shaft 16a of the coupling plate 16 for counter-clockwise rotation by means of a spring 20. In the state of the arrangement shown in FIG. 2, this intermediate lever 19 is seen to be in contact with said cam 14a. Accordingly, when this cam 14a makes one complete revolution in the aforesaid state, the intermediate lever 19 will effect three consecutive cycles of reciprocating movement because of the three projections formed in said cam 14a. A column 21 which is fixed to the base plate 2 and extends upright outwardly therefrom is brought into contact with the intermediate lever 19 whenever the coupling plate 16 has made an upward movement in FIG. 2, and thus, the reciprocating movement of the intermediate lever 19 which is effected by the rotation of the cam 14a is arrested. A transmitting means, i.e., an actuating pin 22 is attached, for movement sideways as viewed in FIG. 2, to a supporting member 23 which, in turn, is attached to the base plate 2, and one end of this actuating pin 22 is always kept in contact with the intermediate lever 19 by means of a spring 24. The other end of said actuating pin 22 is adapted to be in contact with the claw member 37 which will be described later.

Figure 5:
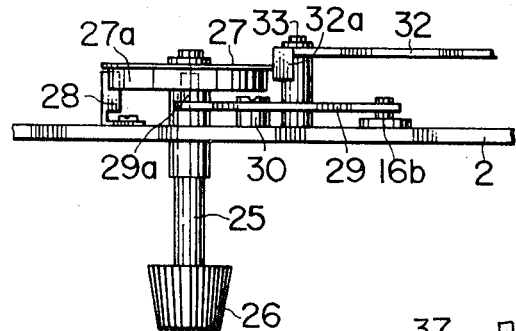
FIG. 5 is a representation as viewed from the line V—V in FIG. 2.

A shaft 25 is secured to the base plate 2 (see FIG. 5) in such a way that this shaft 25 is rotated by turning a knob 26 externally of the projector, said knob 26 being secured to the free end of said shaft 25. Cams 27 and 27a are secured to this shaft 25 integrally therewith. The cam 27a is provided with an annular groove 27b which is formed in one side thereof in such a manner as is in an eccentric relation with respect to said shaft 25. This cam 27a is also provided, in its periphery, with three notches which are adapted to engage a click-spring 28. A switch-over lever 29 having a pin 29a and a forked portion 29b is rotatably mounted on a shaft 30. Said pin 29a is received in the groove 27b of the cam 27a, and said forked portions 29b is coupled to the pin 16b of the coupling plate 16. Accordingly, it will be understood that, by rotating the cams 27 and 27a by turning the knob 26, the coupling plate 16 is able to selectively assume the three positions as desired, i.e., the lowermost position (the position shown in FIG. 2), an intermediate position and the uppermost position.

Figure 4:
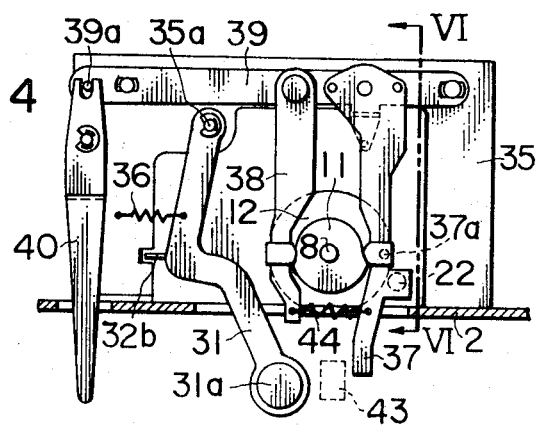
FIG. 4 is a sectional view taken along the line IV—IV in FIG. 2.

A filter member 31 having a filter 31a is secured to a shaft 35a of an auxiliary base plate 35 which is secured to the base plate 2. This filter member 31 is provided so as to be able to rotate clockwise in FIG. 4 by means of a spring 36. A filter actuating lever 32 is mounted on a shaft 33 for clockwise rotation by a spring 34. This filter actuating lever 32 has an arm 32a which is in contact with the peripheral face of the cam 27, and another arm 32b which is in contact with the filter member 31. Accordingly, when the coupling plate 16 is shifted upwardly in its position by the manipulation of the knob 26, said cam 27 forces the filter actuating lever 32 to rotate counter-clockwise. This movement of the filter actuating lever 32, in turn, forces the filter member 31 to rotate counter-clockwise also, resulting in that the aperture 43 is covered by the filter 31a.

Figure 6:
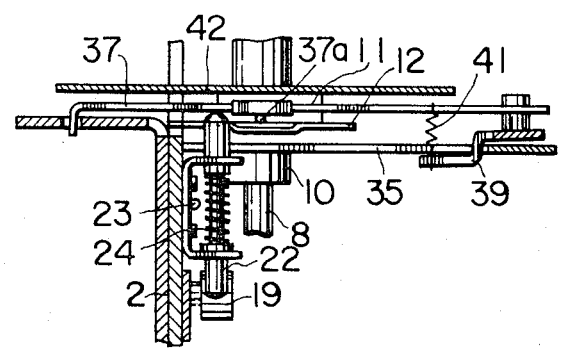
FIG. 6 is a sectional view taken along the line VI—VI in FIGS. 2 and 4.

A claw member 37 which is adapted to engage, at its tip, the perforations formed in the film strips, and an auxiliary member 38 are both rotatably mounted on an adjusting plate 39 which, in turn, is secured to the auxiliary base plate 35 for vertical movement. An adjusting lever 40 which is coupled to said adjusting plate 39 is used to position the adjusting plate 39 in place during the manufacturing process of the projector. A spring 44 is provided between the claw member 37 and the auxiliary member 38 to always keep these two members in contact with the peripheral face of the cam 11. The claw member 37 is secured to the adjusting plate 39 so as to be allowed to move vertically in FIG. 6. A spring 41 is provided to bring the pin 37a of the claw member 37 into contact with the side face of the cam 12.

Description will hereunder be directed to the three kinds of operations of the projector stated above.

First, description will be made on the manner of operation for the standard projection in which the film is fed at a rate of 24 strips or 18 strips per second. The knob 26 may be turned to set the projector to the condition of the standard projection. Whereupon, the coupling plate 16 is placed in its lowermost position as shown in FIG. 2. As the shaft 8 is rotated by the driving motor 3, the cam 14a is rotated accordingly so that the intermediate lever 19 repeats its reciprocating movement. Since the actuating pin 22 is in contact with the stepped portion 19b of the intermediate lever 19 during the aforesaid movement, said actuating pin 22 is shifted to the left side from its position shown in FIG. 2 owing to the reciprocating movement of the intermediate lever 19, but this actuating pin 22 will never be moved to the right side. In such an arrangement, the film is fed in such a way as will be described below, by the action of the cams 11 and 12 which are rotated by the shaft 8. As the shaft 8 is rotated counter-clockwise in FIG. 4, the claw member 37 is pushed upwardly by the cam 11. Whereupon, the claw member 37 is urged downwardly in FIG. 6, against the force of the spring 41, owing to its engagement with the cam face which is formed in the side face of the cam 12, and accordingly, the tip of the claw member 37 is not brought into engagement with the film. After the claw member 37 has been pushed upwardly again in the manner described above, said claw member 37 is now allowed to move upwardly in FIG. 6 by its engagement with the cam 12. Thus, the tip of the claw member 37 is brought into engagement with the perforations of the film. As the shaft 8 is rotated further, causing the claw member 37 to move downwardly in FIG. 4 owing to its engagement with the cam 11, said claw member 37 will effect the advancement of one strip of film. In this manner, the film is fed one strip at a time for one revolution of the shaft 8.

Description will next be directed to the manner in which the slow-motion projection is performed. The knob 26 may be operated to the position of the slow-motion projection. Whereupon, the switch-over lever 29 is rotated counterclockwise by the cam 27a, and the coupling plate 16 is shifted upwardly from its position shown in FIG. 2, to be placed in its intermediate position. During this movement of the coupling plate 16, the intermediate lever 19 also moves upwardly. Accordingly, the actuating pin 22 is relieved of its engagement with the stepped portion 19b of said lever 19 and is shifted toward the right side relative to the position shown in FIG. 2 because of its engagement with the side face of the intermediate lever 19. As a result, the actuating pin 22 pushes the claw member 37, by the tip on the right side of said pin 22, to thereby prevent the claw member 37 from being brought into contact with the cam 12. Even when the shaft 8 is rotated under this condition, the tip of the claw member 37 is unable to engage the perforations of the film and the claw member 37 is allowed to move only vertically in FIG. 4 by the cam 11. Therefore, there takes place no feeding of the film at all. However, the intermediate lever 19 is forced to make reciprocating movement by means of the cam 14a. Accordingly, when the intermediate lever 19 is shifted to the left side from its position shown in FIG. 2, the actuating pin 22 is also shifted to the left side in its position, resulting in that the claw member 37 is brought into contact with the cam 12. Since, in this embodiment, the cam 14a has been given a configuration such that the claw member 37 is adapted to effect the feeding of film—in the same way as that for the aforedescribed standard projection—at the rate of advancement of one strip of film at a time for three revolutions of the shaft 8, the film is fed at a reduced speed which is one third of the speed necessary for the standard projection. Thus, a slow-motion projection is performed.

Description will hereunder be made on the stop-motion projection. The knob 26 may be operated to be placed in the position of the stop-motion projection. Whereupon, the coupling plate 16 is brought to its upper position by the cam 27a. Under this state of the coupling 16, the inclined face 19a of the intermediate lever 19 is brought into contact with the column 21, so that the intermediate lever 19 will not effect any reciprocating movement which is caused by the rotation of the cam 14a. As a result, the actuating pin 22 keeps the claw member 37 in a position away from the cam 12. Therefore, it never occurs that the film is fed with the rotation of the shaft 8. On the other hand, when the coupling plate 16 is located in its upper position, the cam 27 will rotate the filter actuating lever 32 counter-clockwise. Accordingly, the filter member 31 is rotated counter-clockwise in FIG. 4. This counter-clockwise rotation of the filter member 31 will cause the filter 31a to be interposed between the film and the projection lamp to thus prevent the burning of the film. The stop-motion projection is performed in this way.

In FIG. 2, there is shown an arrangement that the filter actuating lever 32 is driven by the cam 27. It should be understood that a pin may be provided on the coupling plate 16 so as to be operative in such a way that, whenever the coupling plate 16 is shifted to its upper position, said pin will be brought into contact with the lower side face of the arm 32b of the filter actuating lever 32 to thereby rotate the latter lever 32 counter-clockwise.

In putting the present invention into practice, it is possible to omit the cams 27 and 27a. In such a case, the switch-over lever 29 may be secured to the shaft 25 integrally therewith and a click means may be provided on this switch-over lever 29.

What is claimed is:

1. A device for switching-over the speed of feeding film in a motion picture projector that includes a first film feeding cam adapted to be rotated interlockingly with the rotation of the shutter and to cause a claw member to effect reciprocating movement in the direction of the travel of the film, a second film feeding cam capable of shifting said claw member into or out of the path of travel of said film to thereby bring said claw member into or out of engagement with the perforations of the film, a cam member adapted to rotate synchronously with the rotation of the shutter, and coupling member adapted to be positioned in first, second and third positions by manual operation, and which is operative so that the film is adapted to be fed intermittently by the continous rotation of said first and second film feeding cams, wherein said device comprises:

an intermediate lever having at its one side a first and a second cam face and at its other side a third cam face and being pivotably secured to said coupling member so that, when said coupling member is in said first position, said intermediate lever is positioned so as not to cause said cam member to affect said claw member, when said coupling member is in said second position, said intermediate lever is positioned so as to be in contact with said cam member thereby affecting said claw member, and when said coupling member is in said third position, said intermediate lever is positioned so as to be out of contact with said cam member, a transmitting means disposed between said intermediate lever and said claw member so that, when said coupling member is in said first position, said transmitting means is positioned so as to be in contact with said first cam face of said intermediate lever whereby not being affected by swinging action of said intermediate lever, when said coupling member is in said second position, said transmitting means is positioned so as to be in contact with said second cam face of said intermediate lever whereby transmitting the swing action of said intermediate lever to said claw member and intermittently interrupting the contact between said claw member and said second film feeding cam, and when said coupling member is in said third position, said transmitting means is positioned so as to be in contact with said second cam face of said intermediate lever whereby causing said claw member to be out of contact with said second film feeding cam, and a filter member having a heat-insulating filter and associated with said coupling member, said filter member including a spring means urging said filter member in one direction away from the light path leading to the film so that, when said coupling member is brought into said first and second positions, said heat-insulating filter returns to one and the same position away from said light path by the action of said spring means, and when said coupling member is brought into said third position, said filter member is positioned so as to move said heat-insulating filter into said light path by the action of interlocking with said coupling member.

2. A device according to claim 1, in which said transmitting means consists of a pin being urged in the direction in which one end of said pin can be in contact with said intermediate lever and the other end of said pin can be in contact with said claw member.

3. A device according to claim 2, in which said device further comprises a switch-over cam capable of switching said coupling member in said three positions and moving said heat-insulating filter in and out of said light path by said manual operation.

References Cited
UNITED STATES PATENTS

| | | | |
|---|---|---|---|
| 3,168,743 | 2/1965 | Nesson | 352—180 |
| 3,252,748 | 5/1966 | Schellschmidt | 352—180 |
| 3,261,654 | 7/1966 | Faber et al. | 352—180 UX |
| 3,481,662 | 12/1969 | Procop | 352—180 |
| 3,502,403 | 3/1970 | Riedel | 352—180 X |
| 3,533,688 | 10/1970 | Painton | 352—169 X |
| 3,536,389 | 10/1970 | Reinsch et al. | 352—180 |

FOREIGN PATENTS

| | | | |
|---|---|---|---|
| 1,355,874 | 12/1964 | France | 352—180 |

LOUIS R. PRINCE, Primary Examiner

J. W. ROSKOS, Assistant Examiner

U.S. Cl. X.R.

352—148, 169